Aug. 28, 1951  R. HARVEY  2,565,656
STERILIZER
Filed July 29, 1946  2 Sheets-Sheet 1
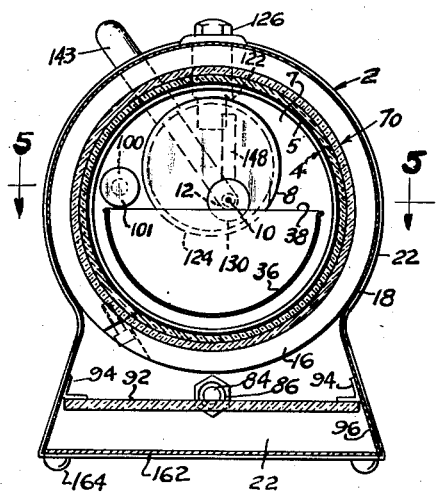
Fig. 4.
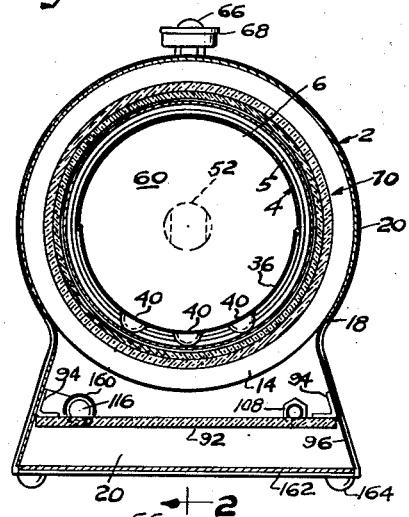
Fig. 3.
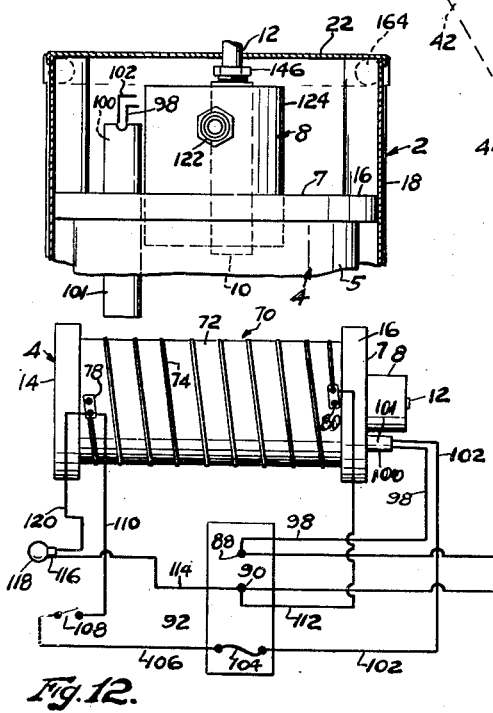
Fig. 5.
Fig. 12.
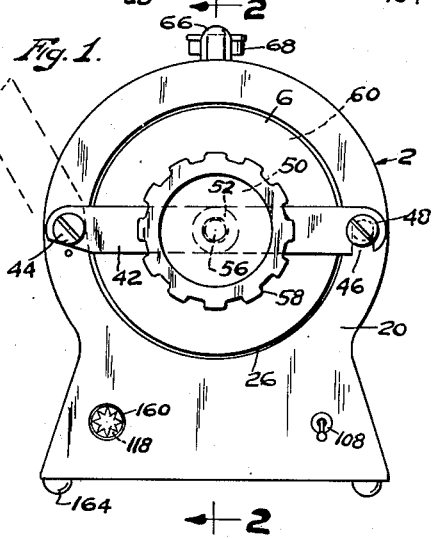
Fig. 1.
INVENTOR.
Rupert Harvey Aug. 28, 1951
R. HARVEY
2,565,656
STERILIZER
Filed July 29, 1946
2 Sheets-Sheet 2
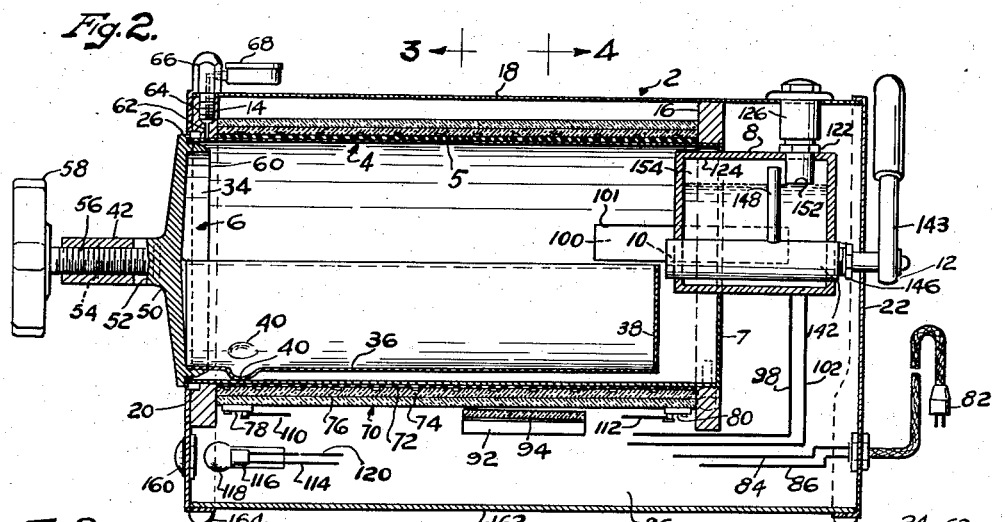
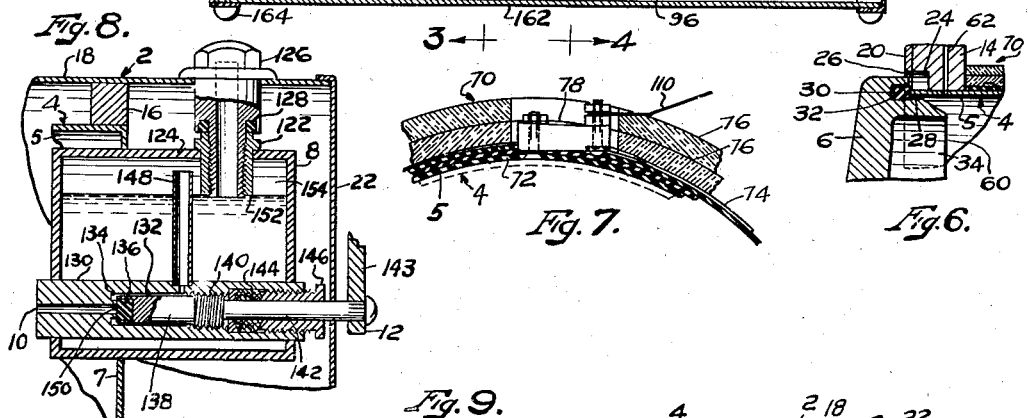
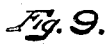
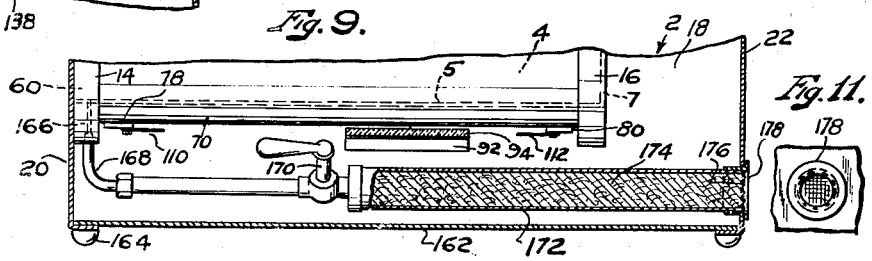
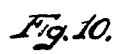
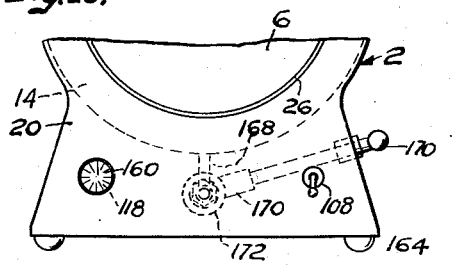
INVENTOR.
Richard Harvey Patented Aug. 28, 1951

2,565,656

UNITED STATES PATENT OFFICE 2,565,656

STERILIZER

Richard Harvey, Los Angeles, Calif.

Application July 29, 1946, Serial No. 686,801

8 Claims. (Cl. 21—85)

1

My invention relates to sterilizers and more particularly to apparatus adapted for sterilizing tools and other various equipment which is used by surgeons, dentists, barbers, dermatologists and the like.

Manifestly an object of my invention is to provide a sterilizer of simplified construction, which may be conveniently employed for a rapid and effective sterilization of various articles.

Accordingly, an object of my invention is to provide a sterilizing apparatus, having an airtight chamber which is heated by means of an electric heating element under control of a thermostat, also, having a suitable chamber closing disc means which is slidably held in position and having a suitable tray means adapted for holding thereon said tools and equipment and also, said apparatus having a suitable fluid vaporizer adapted for imparting a quantity of vapor into said sterilizing chamber with which to sterilize said tools and equipment.

A further object of my invention is to provide a sterilizing apparatus having an airtight chamber and also a suitable closing disc means for closing same, said chamber having a suitable heating apparatus adapted for maintaining high temperature in said chamber and in addition, said chamber having a suitable vaporizer wherein suitable germicidal fluid is placed, vaporized and released therefrom into said airtight chamber for sterilizing the tools and equipment placed therein.

Another object of my invention is to provide said sterilizer with a chamber wherein a removable tray is positioned, said tray having a disc attached thereto which is adapted for closing said chamber and also, having suitable indentations disposed therein for guiding said tray including said disc into its closing position.

A further object of my invention is to provide said sterilizer with an airtight sterilizing chamber and a vaporizer wherein the germicidal fluid is contained, said vaporizer having means for directing a gasified fluid into said sterilizing chamber and also, said vaporizer having a suitable valvular control means for releasing a quantity of said vaporized fluid into said sterilizing chamber and for controlling its escape therefrom.

Another object of my invention is to provide said sterilizer with a suitable muffler means having a control valve connected therewith, said muffler being adapted for discharging the gases from said sterilizing chamber after each sterilizing operation and thereby preventing a discharge of hot gases upon the operator of said sterilizing apparatus.

My invention also has for its objects to provide such means that are positive in operation, convenient in use, easily installed in a working position and easily disconnected therefrom, economical in manufacture, relatively simple, and of general superiority and serviceability.

The invention also comprises novel details of construction and novel combinations and arrangements of parts, which will more fully appear in the course of the following description.

Reference is now had to the accompanying drawings in which like reference characters designate similar parts in the several views.

In the drawings:

Fig. 1 is a front elevational view of the sterilizer.

Fig. 2 is a vertical and longitudinal view thereof, taken on the line 2—2 of Fig. 1.

Fig. 3 is a vertical sectional view thereof, taken on the line 3—3 of Fig. 2.

Fig. 4 is another vertical sectional view thereof, taken on the line 4—4 of Fig. 2.

Fig. 5 is a fragmentary horizontal and sectional view of the sterilizer, taken in the direction of arrows 5—5 of Fig. 4.

Fig. 6 is an enlarged fragmentary sectional view of the chamber closing disc, showing same in relation to the sterilizing chamber.

Fig. 7 is a fragmentary sectional view of said sterilizing chamber including the heating and the insulating means associated therewith.

Fig. 8 is a vertical sectional view of the germicidal fluid container, showing same in relation to said sterilizing chamber.

Fig. 9 is a fragmentary sectional and partly longitudinal view of the muffler.

Fig. 10 is a fragmentary and partly elevational view thereof, taken from the front and showing said muffler including its control, in position.

Fig. 11 shows an end elevational view of the muffler outlet.

Fig. 12 is a wiring diagram of the apparatus.

Describing my invention more in detail, in its broader aspects, said invention comprises a sterilizer, generally designated by numeral 2, which consists of an airtight chamber 4 made in form of a shell 5, the front end of which is enclosed by means of a removable closing disc 6 while the rear end thereof is provided with an end plate 7, wherein a suitable fluid container 8 is mounted within the upper section thereof and extending partially into said chamber 4, and which is provided with a fluid discharge opening or passage 10 controlled by means of a suitable valve member 12.

Said shell 5 of said chamber 4, is provided with a front ring member 14 and a rear ring member 16, each of which is enclosed by and provides a support for a suitable side cover 18, which extends the length of said chamber 4 and slightly beyond said rear ring member 16, as shown in Fig. 2, having the end thereof held in place and position by means of the front end plate 20 and the rear end plate 22, respectively.

Said front ring member 14 is provided with a recess 24 which coincides in diameter with the front opening or passage 26 disposed in said front end plate 20, and thereby allowing the end section 28 of said shell 5 to remain exposed, as shown in Fig. 6.

The end section 28 is held against a gasket 30, which is mounted within a groove 32 of said closing disc 6.

Said closing disc 6 is provided with an inwardly extending flange 34 adapted for holding a suitable tray member 36 in place, said tray extends inwardly into said chamber 4 having its end enclosed by means of a closure plate 38, thus allowing the surgical instruments, tools and equipment to be held therein during the process of sterilization.

In order to guide said closing disc 6 with said gasket 30 into its closing and central position, said tray 36 is provided in close proximity to said flange 34 with a set of outwardly formed indentations 40, which are so arranged, whereby said tray including said disc 6 may be slidably lifted into position, and thereby eliminating an improper mounting thereof and preventing the gas leakage from said chamber 4, when same is closed.

For holding said disc 6 in position, said front end of said chamber 4 is provided with a hinged cross bar 42, one end of which is hingedly mounted upon a hinge screw 44 mounted on the front and left side of said front ring member 14, while the other end thereof is provided with a U-shape passage 46 which is adapted for engaging a lock screw member 48, mounted upon the front and the right side of said ring member 14, as shown in Fig. 1.

Said hinge screw 44 including said lock screw 48 are secured upon said front ring member 14 and thereby providing stability in the structure of said apparatus.

The center section 50 of said disc 6 is provided with a locating lug member 52, while the center section 54 of said cross bar 42 is provided with an adjustably mounted lock rod 56, the end of which is adapted to bear against the said locating lug member 52 when actuated by a knob member 58, and thereby holding said disc 6 in its closed position and over the front opening 60 of said chamber 4.

Within the upper section of said front opening 60 a vent hole 62 is provided, having a suitable passage 64 leading to and inter-connecting a plug member 64 in which a pressure gage 68 is mounted, as shown.

Said shell 5 of the chamber 4, is provided with a heating unit 70, which comprises a layer of non-conductive material such as mica 72, whereon a suitable strip of heating wire 74 is wound and covered by means of layers of insulating material such as sheets of asbestos 76, while the ends of said heating wire 74 are each connected to suitable terminal connectors 78 and 80 respectively.

Said heating unit 70 receives the electrical current through a plug member 82, which is provided with lead wires 84 and 86, connecting the terminals 88 and 90 respectively, disposed upon a terminal panel 92 which is mounted upon suitable brackets 94 and connected to the lower section 96 of said side cover 18.

The terminal 88 is also provided with a lead wire 98 connecting a thermostatic control unit 100, which is mounted within a housing 101, from which extends another lead wire 102 and which is connected to a suitable fuse 104.

Said fuse 104 connects with a lead wire 106, which leads to a switch 108 and from which another lead wire 110 leads to and connects said connector 78.

The terminal 90 is provided with a lead wire 112 which is connected to said connector 80, for completing the circuit of said heating unit 70.

In order to provide a visual indication in the apparatus when said switch 108 is closed, and when the electric current is on and passing through the circuit, said terminal 90 is provided with a lead wire 114, which connects a lamp socket 116 in which a suitable lamp bulb 118 is mounted, and from which another lead wire 120 connects with said terminal connector 78 for completing the lamp circuit.

Said fluid container 8, mounted in said plate 7, is provided with an inlet 122 which is disposed within the upper section of the shell 124, and which is enclosed by a removable plug member 126, provided with a gasket 128 to prevent the fluid or gas leakage from said container.

In said container 8 said valve 12 is provided with a housing 130, wherein said discharge passage 10, at one end, extending inwardly and has a recess or passage 132 provided with a valve seat 134, as shown in Fig. 8.

Said valve seat 134 is enclosed by a suitable plug 136 which is disposed at the end of a valve plunger member 138 the position of which is controlled by a screw threaded section 140.

In said threaded section 140, a stem member 142 is provided, which extends outwardly therefrom and is provided with a handle bar 143 upon its end, said handle bar extends over said rear end plate 22, as shown in Fig. 2.

For preventing leakage, said stem member 142 is provided with a suitable packing 144 which is held in place by means of a packing gland member 146.

Said valve housing 130 is also provided with a pipe 148, which interconnects said passage 132 and which extends upwardly therefrom, having its extended end disposed in close proximity to the upper section of said shell 8 and through which the gases formed in the upper section of said container are allowed to flow, passing through the passage 150 and into said discharge passage 10 which leads to said chamber 4 of said apparatus.

In orperation, a suitable fluid, preferably of low boiling point and high germicidal properties, is disposed within said container 8 by removing said plug 126, and in such amount that will reach the height for said fluid to remain approximately at the level with the edge 152 of the inlet member 122, thus providing a gas chamber area 154.

When said container 8 is filled and said plug 126 is replaced in said inlet member 122, then the heater unit 70 is plugged-in into 110-volts circuit, and the temperature is then allowed to be raised in said chamber 4.

For practical purposes, it has been found that a temperature of 250° Fahrenheit is sufficient, and accordingly said thermostatic control 100 is set for maintaining said temperature.

During the heating process of said chamber 4, the temperature of said germicidal fluid disposed within said container 8 is raised over and above the boiling point (which is approximately 180° F.) whereupon the fluidal gases, thus forming, are concentrated in said gas chamber area 154.

In the means time, the surgical instruments, tools and other equipment required to be sterilized, are placed within said tray 36, which is then placed within said chamber 4 whereupon said chamber is closed by means of said closing disc 6, and which is held in place by said cross bar member 42, as shown in Fig. 2.

During the heating period, said lamp 118 will remain lighted by the electric current flow passing through the circuit of the apparatus, thus providing a visible signal through the window 160, that the apparatus is functioning.

When the predetermined temperature in said apparatus is reached, during which time said germicidal fluid becomes vaporized, then said valve 12 is opened for only a fractional period of time and closed immediately, thus permitting only a small portion of said vaporized fluid to pass through and be discharged into said sterilizing chamber 4, wherein said tray 36 together with the instruments, tools and equipment to be sterilized, is positioned.

The fractional openin gand closing of said valve 12 allows a certain amount of evaporated fluidal gas to pass into said sterilizing chamber 4, wherein a pressure is raised, because of admission of said fluidal gas, to approximately 20 lbs., as indicated on said pressure gage 68.

After an interim of few minutes of sterilization, said closing disc 6 is released from its closed position and then said tray 36 with the contents therein is removed from said chamber 4.

This process of sterilization, as herein described, completely eliminates the rusting of the instruments or tools, and also eliminates all possibilities of said instruments remaining contaminated, by completely and entirely destroying all bacteria thereon, and in a short period of time.

Said sterilizer is also provided with a suitable base plate 162 and a set of supports 164, said base plate being adapted for preventing dust accumulation within the enclosed section of said apparatus and also for preventing tampering with the electrical equipment mounted therein and in their respective positions.

In order to prevent the hot gases, held under pressure within said chamber 4, from being blown upon the operator of the apparatus and for permitting an escape therefrom before said disc 6 is removed from its seated position, the bottom section of said front ring member 19, as shown in Fig. 9, is provided with a suitable outlet passage 166, having a suitable tubular conduit member 168 connected thereto and extending therefrom, which is provided with a control valve member 170.

To said valve member 170 a suitable receptacle or housing 172 is connected, which extends rearwardly to the back of said sterilizer and, wherein an absorbent material 174 is packed, for absorbing any moisture which may be present and passing from said chamber 4, the extended end thereof leading into an outlet passage 176, which is provided with a suitable screen member 178, so that said absorbent material may be removed from said receptacle and be exchanged for new when required.

When in operation, said valve member 170 is first opened allowing the gases to escape from said chamber 4 passing into said muffler 172, then said gases pass through said absorbent material 174 and outwardly through said screen 178, which causes the pressure in said chamber 4 to be completely reduced, and also, directing the gaseous flow away from the operator of the apparatus, whereupon said disc member 6 is released and the tray 36 is removed from said chamber, as hereinbefore provided.

While I have thus described my invention with great particularity, it will be clear that the same may be modified throughout a wide range.

I accordingly do not propose to be limited to the exact details of construction herein shown on the drawings and described in the specification, but reserve the rights in practice to make the necessary changes and modifications therein which may come within the scope of the appended claims.

I claim as my invention:

1. A sterilizing apparatus of the class described comprising, a sterilizing chamber having an open front end and a closing end plate, a fluid container in the upper section of said end plate and extending partially into said chamber for retaining therein germicidal fluid solution, an electrical heating means surrounding said sterilizing chamber for heating said chamber including said fluid container, a closing disc means for enclosing said open front end of said chamber, a cross bar pivotally mounted at the front end of said chamber for holding said closing disc means in closed position, a valve housing in said fluid container having a discharge opening leading into said sterilizing chamber, a pipe in said valve housing extending upwardly and terminating in close proximity to the shell of said fluid container for removing vaporized fluidal gas from the gas chamber area and above the fluid level of said fluid solution, and a valvular means in said valve housing for regulating the inflow of gaseous germicidal fluid into said sterilizing chamber.

2. A sterilizing chamber of the class described as disclosed in claim 1, wherein a passage is provided at the front end of said chamber having a conduit attached thereto and extending to the rear of said sterilizing chamber, a control valve secured to said conduit for controlling the release of the gaseous pressure from said chamber, a receptacle attached to said control valve, and absorbent material in said receptacle for absorbing the moisture passing from said sterilizing chamber and for reducing the sudden outflow of hot gases passing therefrom.

3. A sterilizing apparatus of the class described, comprising, a sterilizing chamber having an end plate, a fluid container mounted in said end plate and extending partially into interior section of said sterilizing chamber and in close proximity to the top section of the shell of said sterilizing chamber, a fluid inlet in said fluid container, a removable plug member in said fluid inlet for sealing the fluid when disposed in said fluid container, a valve housing disposed in close proximity to the bottom section of said fluid container, said valve housing having a discharge passage directed into said sterilizing chamber, a manually operable plunger arranged for rotation in said valve housing and having a threaded engagement therewith, a recess in said valve housing connecting said discharge passage, an upwardly extending pipe in said valve housing for connecting said recess and having the upper end of said upwardly extending pipe disposed in close proximity to the upper section of the shell of said fluid container, a valve stem in said plunger extending outwardly from said valve housing, a handle connected to said stem for rotating said plunger and for providing lengthwise movement therein, thereby opening and closing said discharge passage in said valve housing, and electrical circuit in said apparatus for heating said sterilizing chamber.

4. A sterilizing apparatus of the class described, comprising, a sterilizing chamber having an open end and an end plate at the rear end thereof, a pair of ring means each positioned at the respective ends of said chamber, a disc means in said apparatus for enclosing said open end of said chamber, a cross bar means pivotally mounted upon said front ring means and adapted for holding said disc means in an open and closed position over said front open end of said sterilizing chamber, a fluid container mounted in said end plate and partially extending into the interior of said chamber and for retaining therein germicidal fluid solution, an electrical heating means in said apparatus surrounding said sterilizing chamber for maintaining high temperatures in said chamber including in said fluid container and for vaporizing said germicidal fluid solution container in said fluid container, a fluid inlet in said fluid container for depositing said germicidal fluid solution therein, a plug member for sealing said fluid inlet, a valve housing disposed in close proximity to the bottom section of said fluid container, a discharge passage in said valve housing, a recess in said valve housing connecting said discharge passage, an upwardly extending pipe in said valve housing for connecting said recess and having the upper end of said upwardly extending pipe disposed in close proximity to the upper section of the shell of said fluid container, and a manually operable valve means in valve housing of said fluid container for controlling the discharge passage for vaporized fluid solution passing from said fluid container and into said sterilizing chamber of said apparatus.

5. A sterilizing apparatus of the class described, as disclosed in claim 4, wherein a tray means is provided in said sterilizing chamber and made an integral part of said disc means for facilitating the handling of surgical instruments when the same are disposed therein, and a set of indentation means provided at the bottom of said tray for supporting said tray when positioned in said sterilizing chamber and for guiding said disc means into its center closing position.

6. A sterilizing apparatus of the class described, as disclosed in claim 4, wherein a pilot light is provided in the electric circuit of said heating means of said apparatus, for indicating the thermostatically controlled electric current flow passing through said heating means, when said electric current is on or off, and during the operation of said apparatus.

7. A sterilizing apparatus of the class described, as disclosed in claim 4, wherein a vertically positioned pipe is provided in said fluid container and connecting said manually operable valve means, and having the outlet of said pipe disposed upwardly the end of which being in close proximity to the outer shell of said fluid container, for directing the flow of only gaseous germicidal fluid solution from said fluid container and through said valve means directed into said sterilizing chamber of said apparatus.

8. A sterilizing apparatus of the class described, as disclosed in claim 1, wherein a thermostat control is provided in the electrical circuit of said apparatus for maintaining a required temperature in said sterilizing chamber and said fluid container, when said apparatus is in operation.

RICHARD HARVEY.

REFERENCES CITED

The following references are of record in the file of this patent:

UNITED STATES PATENTS

| Number | Name | Date |
|---|---|---|
| 2,240,001 | Harvey | Apr. 29, 1941 |